United States Patent [19]
Puri

[11] Patent Number: 6,064,982
[45] Date of Patent: May 16, 2000

[54] SMART CONFIGURATOR

[75] Inventor: Deepak Puri, San Francisco, Calif.

[73] Assignee: Netscape Communication Corporation, Mountain View, Calif.

[21] Appl. No.: 08/968,631

[22] Filed: Nov. 12, 1997

[51] Int. Cl.[7] .................................................. G06F 17/60
[52] U.S. Cl. ............................... 705/27; 705/29; 700/95; 700/97; 700/105; 700/107
[58] Field of Search ..................................... 395/500, 712, 395/500.42, 500.43; 364/578; 345/333; 705/26, 27, 29; 700/95, 97, 105, 107

[56] References Cited

U.S. PATENT DOCUMENTS

| | | | |
|---|---|---|---|
| 5,745,765 | 4/1998 | Paseman ................................. | 395/701 |
| 5,844,554 | 12/1998 | Geller et al. ............................ | 345/333 |
| 5,867,387 | 2/1999 | Kavana ................................. | 364/468.03 |
| 5,890,129 | 3/1999 | Spurgeon .................................. | 705/4 |

OTHER PUBLICATIONS

Henderson, "Not Just Browsing—Transform Your Client/Server Network into a Browser/Server Installation", Windows Magazine, p. 264 (download copy), Dec. 1996.

Ray, "Take a Load Off", Computerworld, Sep. 2, 1996, pp. 55, 58 (download copy).

Varney, "Arm Your Salesforce With the Web", Datamation, vol. 42 Issue 16, p. 72 (download copy), Oct. 1996.

*Primary Examiner*—Kevin J. Teska
*Assistant Examiner*—Samuel Broda
*Attorney, Agent, or Firm*—Michael A. Glenn

[57] ABSTRACT

A tool for smart system configuration assists in needs assessment, product/options selection, pricing, and distribution. The tool recommends a system configuration that most nearly meets a customer's needs, based upon the results of an interactive customer product selection session in which the customer progresses through a dialog that is implemented in a series of cascading style sheets. The tool is customizable to meet customer-specific requirements. A proposal template is provided to collect customer input and merge customer responses during the product selection session into fields within a proposal template. The tool is written in client-side JavaScript and Dynamic HTML. Product pricing information provided by the tool is readily updated, for example using push technology.

26 Claims, 11 Drawing Sheets

```
┌─────────────────────────────────────────────────────────┐
│   Smart Configuration August 97 - Netscape      _ □ ×   │
│  ┌───────────────────────────────────────────────────┐  │
│  │     Netscape-OEM Smart Configuration August 97    │  │
│  └───────────────────────────────────────────────────┘  │
│  Choose a Client and Specify a Price Level              │
│                                                         │
│  Please specify the number of users for your servers.   │
│  ┌──────────────────────┐                       ↖       │
│  │ 500                  │                        ╲_71   │
│  └──────────────────────┘                               │
│  Please choose your client  ───── 70                    │
│                                                         │
│     ⦿ Communicator Pro                                  │
│     ○ Communicator                                      │
│     ○ No Client                 ┌─72                    │
│                                 /                       │
│  Please specify your current discount level.            │
│  ┌──────────────────┬─┐                                 │
│  │ No discount yet  │▽│                                 │
│  └──────────────────┴─┘                                 │
│                                                         │
│                                                         │
│                                                         │
│  ┌─┬──────────────────────┬─┬─────────┬─┬──────┬──────┬──────┐ │
│  │N│ configuration scenario 1▽│ go to     ▽│ <back │ next>│cancel│ │
│  └─┴──────────────────────┴─┴─────────┴─┴──────┴──────┴──────┘ │
└─────────────────────────────────────────────────────────┘

FIG. 6
```

| Smart Configuration August 97 - Netscape | | | | |
|---|---|---|---|---|
| Netscape-OEM Smart Configurator August 97 | | | | |

Packaged Options ~80

| Product | User | Sub |
|---|---|---|
| Client and Server Components | | |
| ☐ SuiteSpot | 0 | ☑ |
| ☐ SuiteSpotPro | 0 | ☑ |
| ☐ EPP Standard | 0 | ☑ |
| ☐ EPP Plus | 0 | ☑ |
| ☐ EPP Pro | 0 | ☑ |

Total License Price

Applied level: Level C
Default user: 500
Initial level: No discount yet ▽
Points: 2000

All prices are in US$

Client and Server Components ~81

| Product | User | Subscr | Per User | |
|---|---|---|---|---|
| ☐ Communicator | 0 | ☑ | $48.00 | |
| ☑ CommunicatorPro | 500 | ☑ | $64.00 | $32 |
| ☐ Messaging | 0 | ☑ | $29.40 | |
| ☐ Collabra | 0 | ☑ | $11.50 | |
| ☐ Calendar | 0 | ☐ | $29.40 | |
| ☐ Enterprise | 0 | ☑ | $29.40 | |
| ☐ Certificate | 0 | ☑ | $5.70 | |
| ☐ Proxy | 0 | ☑ | $11.50 | |
| ☐ Catalog | 0 | ☑ | $29.40 | |
| ☐ Mission Control | 0 | ☑ | $5.70 | |

Client and Server components $32

For server product orders of less than 50 seats,

N | configuration scenario 1 ▽ | go to ▽ | <back | next> | cancel

```
Smart Configuration August 97 - Netscape              _ □ ×
         Netscape-OEM Smart Configurator August 97
Sizing Input              │ Create Selection
                          │                                    92
Web:                      │ Sizing Calculation:
        90                │  ⦿ 100-200 MHz Low-end UNIX system or
Number of users [10-100 ▽]│    Pentium PC
Static HTML               │  ○ 140-200 MHz Single processor UNIX or
pages/user/day  [None ▽]  │    Pentium Pro server
Dynamic HTML-             │  ○ 180-400 MHz Dual processor UNIX or Pentium
Text            [None ▽]  │    Pro server
queries/user/day          │  ○ Use multiple machines or high-end SMP
Dynamic HTML-             │    machine
DB              [None ▽]  │  ○ Product x
trans/user/day            │  ○ Product y
Messaging:                │ [Enter Description] [        ]
Number of users [10-100 ▽]│ Selection:
Messages                  │ No hardware selected.
sent/user/day   [None ▽]
Messages
rcv'd/user/day  [None ▽]
Ave. size of
messages (KB)   [<1KB ▽]
Collaboration:
[N configuration scenario 1▽][go to   ▽][<back][next>][cancel]
```

FIG. 8

```
Smart Configuration August 97 - Netscape                    [_][□][X]
          Netscape-OEM Smart Configurator August 97
Recommended Netscape Software Product              User Subscr Per User      Total
─────────────────────────────────────────────────────
CommunicatorPro 500      yes      $64.00   $32,000.00 ──── 105
─────────────────────────────────────────────────────

Total License Price   ╲─101              $32,000.00
┌─103
│Prepared 8/21/97
│
│All prices are in US$
│This price is effective for August 97 only.
│Based on your initial level (No discount yet) and 2000 points reached
│your applied discount level is: Level C.
│For server product orders of less than 50 seats.
│prior order is required and media must be ordered separately.
│EPP and Certificate Server require an initial order of 100 seats,
│and Mission Control an initial order of 200.
│Proxy Server and Mission Control need to be ordered only for the first 1000 seats.
│After this number they are provided at no extra charge.

└─107
       for:                         by:
 ┌─────┐ ┌─────────────────┐   ┌─────────────────┐
 │print│ │                 │   │                 │
 └─────┘ └─────────────────┘   └─────────────────┘

[N] [configuration scenario 1▽] [go to        ▽] [<back] [next>] [cancel]
```

FIG. 9

| Smart Configuration August 97 – Netscape | |
|---|---|
| Netscape-OEM Smart Configurator August 97 | |

Select your Distributor

*111*

This report only shows frequently used skus. View thier site: <u>Ingram Micro</u>  <u>Tech Data</u>
<u>Access Graphics</u> — 115           ‾115       ‾115

*113*          Netscape SKUs

Updated: 6/24/97

|  | Netscape P/N |
|---|---|
|  |  |
|  |  |
| Communicator for Windows 4.0 no docs | 100-04786-00 |
| Communicator Pro for Windows 4.0 no docs | 100-04807-00 |
|  |  |
| Communicator for Macintosh 4.0 no docs | 100-04788-00 |
| Communicator Pro for Macintosh 4.0 no docs | 100-04809-00 |
| Nav 3.0 MAC no Docs | 100-02682-00 |
| Nav 3.0 MAC w/Docs | 101-02690-00 |
| Nav Gold 3.0 MAC no Docs | 100-02022-00 |
| Nav Gold 3.0 MAC w/Docs | 101-02023-00 |
|  |  |
| Communicator for Unix 4.0 no docs | 100-04780-00 |

N | configuration scenario 1 ▽ | go to ▽ | <back | next> | cancel

*FIG. 11*

SMART CONFIGURATOR

BACKGROUND OF THE INVENTION

1. Technical Field

The invention relates to product needs assessment. More particularly, the invention relates to a tool that assists company representatives in configuring a product to meet a customer's needs.

2. Description of the Prior Art

The pace of product and service development is such that it is often difficult for sales and marketing personnel to keep their customer's abreast of current company product offerings, configurations, options, and pricing. Old style print catalogs are typically out of date before they leave the printer, and CD-ROM catalog updates fare no better (this includes such update services as Charles Schwab's "Street Smart").

Further complicating the job of field sales personnel is the need to match the product configuration to the customer's unique needs. For example, in the computer networking industry, e.g. with regard to the sale and installation of an intranet, non-traditional factors such as company policy, security requirements, and acceptable bandwidth, as well as more typical factors such as physical plant and number of workstations, must be taken into account when preparing a proposal for a customer network configuration.

One approach to assisting field personnel and company customer's in assessing and fulfilling customer product needs has been to provide scripted scenarios. Such scenarios, for example as provided by Netscape Communications, Inc. (i.e. "smartpage"), pose a series of questions, the answer to which instructs the field personnel/customer with regard to the most appropriate product. This approach, however, is static and limited to specific "canned" examples.

It would be advantageous to provide an intelligent sales tool that provides field personnel/customers with access to current product information while guiding them through the needs assessment and product selection/configuration process.

SUMMARY OF THE INVENTION

The invention provides a tool for smart system configuration that assists in needs assessment, product/options selection, pricing, and product distribution. The tool recommends a system configuration that most nearly meets a customer's needs, based upon the results of an interactive customer product selection session in which the customer progresses through a dialog that is implemented in a series of cascading style sheets. The tool is customizable to meet customer-specific requirements. A proposal template is provided to collect customer input and merge customer responses during the product selection session into fields within a proposal template. The tool is written in client-side JavaScript and dynamic HTML. Product pricing information provided by the tool is readily updated, for example using push technology, such as Netcaster (manufactured by Netscape Communications, Inc. of Mountain View, Calif.).

BRIEF DESCRIPTION OF THE DRAWINGS

FIG. 6 is an illustration of a pricing information page for the smart configurator of FIG. 1 according to the invention;

FIG. 7 is an illustration of a product options page for the smart configurator of FIG. 1 according to the invention;

FIG. 8 is an illustration of a system needs determination page for the smart configurator of FIG. 1 according to the invention;

FIG. 9 is an illustration of a recommended system configuration page for the smart configurator of FIG. 1 according to the invention;

FIG. 11 is an illustration of a distributor selection page for the smart configurator of FIG. 1 according to the invention.

DETAILED DESCRIPTION OF THE INVENTION

The invention provides a tool for smart system configuration that assists in needs assessment, product/options selection, pricing, and product distribution. The tool recommends a system configuration that most nearly meets a customer's needs, based upon the results of an interactive customer product selection session in which the customer progresses through a dialog that is implemented in a series of cascading style sheets. The tool is customizable to meet customer specific requirements. A proposal template is provided to collect customer input and merge customer responses during the product selection session into fields within a proposal template. The tool is written in client-side JavaScript and dynamic HTML. Product pricing information provided by the tool is readily updated, for example using push technology, such as Netcaster (manufactured by Netscape Communications, Inc. of Mountain View, Calif.).

Figure 1:
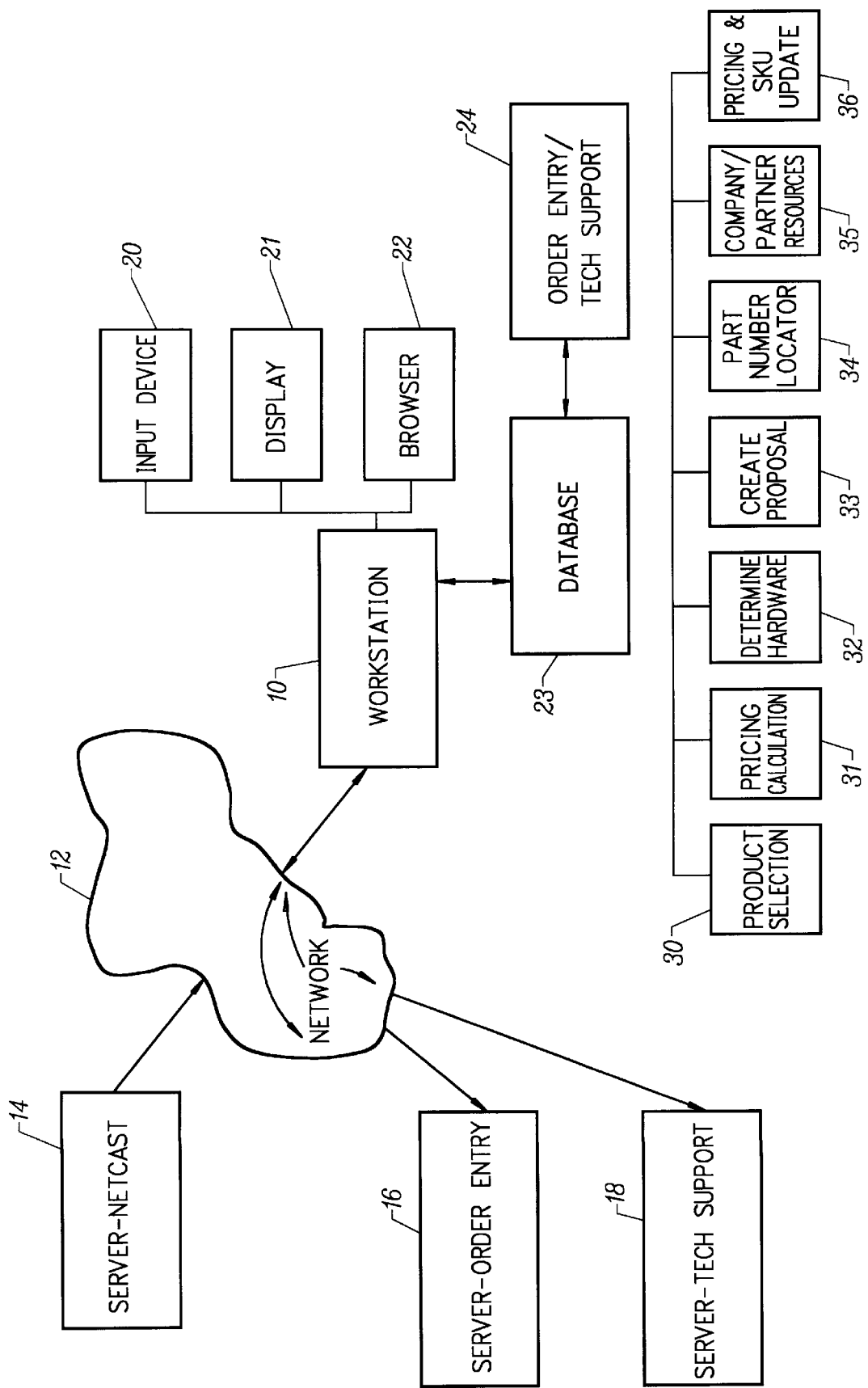
FIG. 1 is a block schematic diagram of a smart configurator according to the invention.

FIG. 1 is a block schematic diagram of a smart configurator according to the invention. The smart configurator operates in connection with a customer and/or field personnel workstation 10. The workstation may be connected to a network 12 using any known connection technology including, for example, LAN, WAN, dial-up, or wireless connection technology. Such network access allows the workstation to access any of a number of remote resources, such as a pricing and stock keeping unit (SKU) information server 14 (discussed in greater detail below), an order entry server 16, and a technical support server 18. Each of these servers may reside proximate to an associated company function, e.g. the technical support server may be situated in the technical support department. This scenario comprehends a distributed system. However, each of these function may reside within a tightly coupled company data processing system, e.g. on a mainframe.

The actual location and function of the various servers that may be accessible to the smart configurator is a matter of choice to those skilled in the art. Significant to the invention is the ability to perform all sales related functions off-line, for example in the field at a customer location. In fact, it is contemplated that the smart configurator will be made available to a company's customers, for example by down load from a company Web page. Further, it is contemplated that the customer will be guided through the sales process by the smart configurator off-line at a location remote from the company facilities, i.e. in the field. It is thought that the primary use of a network connection to the smart configurator is to provide update information to the smart configurator using push technology, such as that embodied in the Netcaster product described above (and in greater detail below).

A typical workstation 10 may be any personal computer or other computer that is capable of running a program locally. As discussed above, the smart configurator is preferably implemented in a computer program, for example dynamic HTML or JAVA script, although it may be implemented in other programming languages. The workstation includes an input device 20, which may be a pointing device, such as a mouse or trackball, and/or a keyboard; a display 21; and a browser 22 (e.g. Netscape Communicator, for example in those embodiments of the invention that are implemented in HTML and/or JAVA). The browser provides a graphical user interface that presents a familiar look and feel to most field personnel and customers and thus provides a user with a readily accepted environment in which to operate the smart configurator.

The smart configurator includes various automated and autonomous (i.e. off-line) functions that are accessible by the browser through a database 23. The database includes modules for any desired function that is part of the sales process (although the invention may be implemented for other than sales applications, for example in medical examinations). The preferred embodiment of the invention includes a product selection module 30, a pricing calculation module 31, a module that assists a user in determining hardware needs 32, a module that assists company field personnel in creating a customer proposal 33, a module that assists company field personnel in locating a part number 34, a module that provides access to company and/or partner resources 35, and a module that provides pricing and SKU information 36. The various modules comprise linked pages that allow a user to move throughout a dialog in an expeditious fashion. Further, each module is linked to each other module in a coordinated fashion, such that the completion of any phase in the dialog automatically leads to a next phase and automatically passes information obtained during all previous phases to the present phase of the dialog. Thus, information captured in a form is automatically entered into subsequent forms as appropriate. The invention also includes a mechanism 24 for capturing order entry information and/or technical support requests and for communicating with a remote location regarding same.

Figure 2:
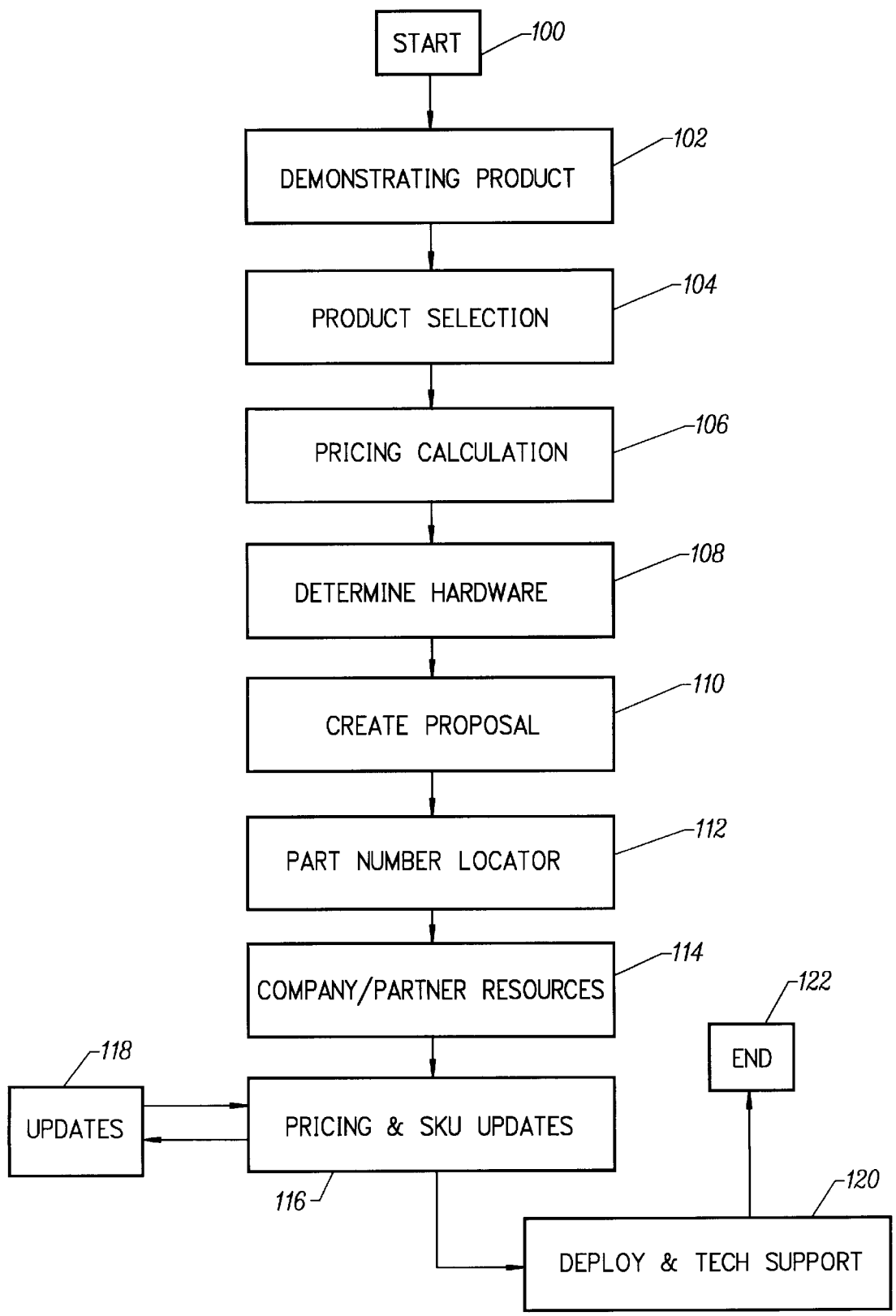
FIG. 2 is a flow diagram showing operation of the smart configurator of FIG. 1 according to the invention.

FIG. 2 is a flow diagram showing operation of the smart configurator of FIG. 1 according to the invention. At the start (100) of a session, the company field personnel may demonstrate a product (102) to an established or prospective customer. The smart configurator provides an interactive, off-line product selection dialog (104) in which a matrix of company products is presented. The customer or field personnel select products, for example by checking boxes on HTML forms which are displayed on the workstation display. The smart configurator then performs a pricing calculation (106), taking into account such factors or special pricing, discounts, and delivery terms. If the product ordered is a software product, for example an enterprise management system, the smart configurator determines the appropriate hardware requirements to run the software in an acceptable fashion (108) and displays this information on the workstation display. Such information may include third part (e.g. partner) information.

At this point, the smart configurator may optionally generate a proposal for the customer (110). In the preferred embodiment of the invention, various transaction specific details are merged into a formatted proposal that may include standard company sales terms and conditions. The smart configurator also provides a part number locator 112 that provides order information. The smart configurator may also optionally be used to provide additional information to the customer (or sales personnel if appropriate) in the form of company and partner information (114), e.g. telephone and email numbers of key contacts, contact information for company and/or partner sales personnel, links to relevant company and/or partner Web pages, e.g. sales, product details, system metrics (such as memory requirements and other basic hardware configuration guidelines) and benchmark information.

Finally, the smart configurator may optionally be placed on-line to check for the existence of more current pricing and SKU information (116) at a company server (118). An on-line connection may also be used to enter an order, receive a confirmation and shipping date, or request technical support (120). Thereafter, the transaction is complete (122).

As discussed above, one significant feature of the invention is the ability of the user to operate the smart configuration off-line. In this past, off-line systems were difficult to maintain because the information they contained quickly became outdated and an update mechanism, such as a replacement disk, was needed. The invention significantly exploits to advantage network broadcast or "push" technology to allow the off-line smart configurator to be updated automatically each time the workstation on which the smart configurator resides is brought on-line for any purpose, e.g. to check e-mail. The preferred embodiment of the invention uses Netscape Netcaster, which enables a user to subscribe to and schedule automatic delivery of information, instead of manually downloading and searching for information.

Figure 3:
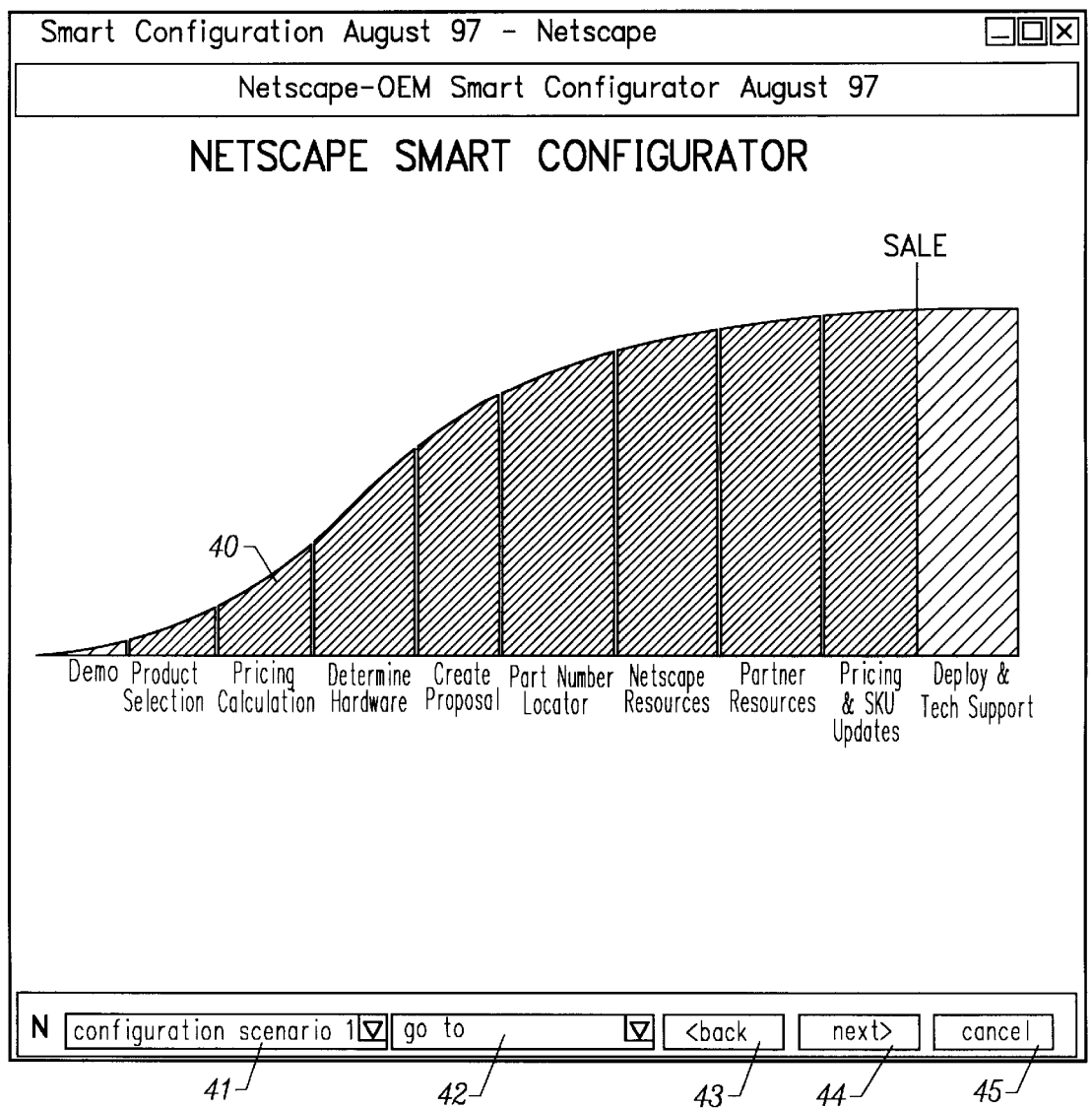
FIG. 3 is an illustration of an overview page for the smart configurator of FIG. 1 according to the invention.

FIG. 3 is an illustration of an overview page for the smart configurator of FIG. 1 according to the invention. It should be appreciated that the actual appearance and content of the page is a matter of choice for those skilled in the art. Further, the overview page is preferably preceded by a main page (not shown) that allows quick navigation to a most appropriate location in the smart configurator. For example, it should not be necessary to traverse an entire session to access the resources page.

The overview page can be customized for a partner to include the partner's logo and to add general information about the partner (as discussed below). The overview page provides a navigation tool for the sales session, in which the various steps outlined in connection with FIG. 2 above are presented graphically. Any step in the session may be accessed directly by clicking on that portion of the graphic representation. For example, clicking on Pricing Calculation 40 directs the user to the Pricing Calculation page (discussed below). Each page of the smart configurator may also include such controls and a select bar 41, a go to bar 42, a <back button 43, a next> button 44, and a cancel button 45.

As discussed above, the smart configurator may be customized for company partners. For example, an OEM name may be replaced by a partner name, e.g. by placing the partner name in an anchor frame, thereby displaying the partner name in all following pages. The partner's logo may be placed in a bottom frame, thereby also displaying the partner's name in all following pages. Further, the partner's specific sales terms and conditions or other legal or business specific requirements may be included in the smart configurator.

Figure 4:
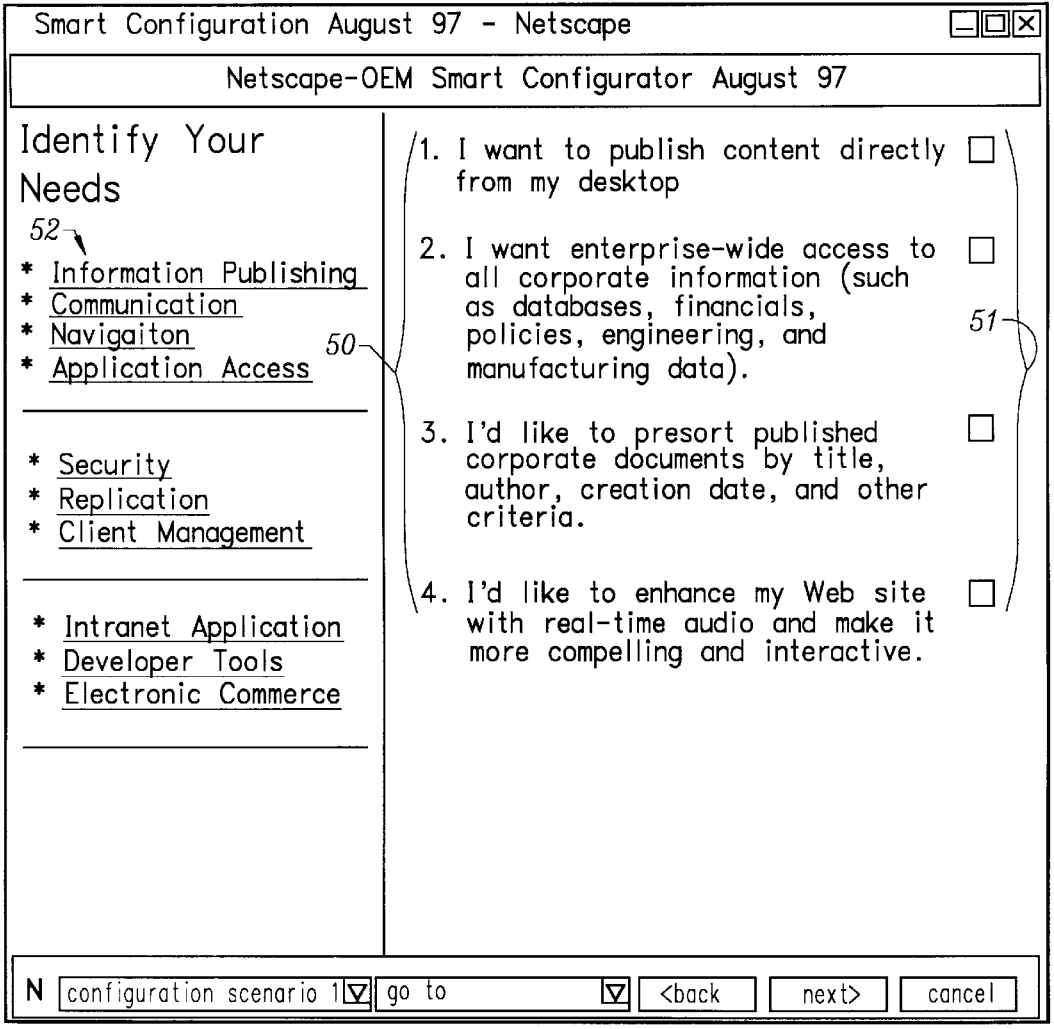
FIG. 4 is an illustration of a customer needs identification page for the smart configurator of FIG. 1 according to the invention.

FIG. 4 is an illustration of a customer needs identification page for the smart configurator of FIG. 1 according to the invention. The needs identification page is key to assessing a customer's product requirements. In the preferred embodiment of the invention, the customer may select among various statements 50 by checking a box 51 associated with each statement. The statements are plain language statements that are intended to express a particular product need. The needs identification page also includes various links to other topics, e.g. Information Publishing 52, that may be selected to bring up additional statements. In this way, the needs assessment process may be thought of as being hierarchical, i.e. as generalized statements are selected the smart configurator suggests more specific statements until the customer's needs are thoroughly and accurately assesse.

The needs identification page may be customized for a partner by adding topics which help in determining the applicability of various partner products based upon customer needs. For example, if the company is a software company and the partner is a hardware company, the smart configurator can include both company and partner topics to assist the field personnel/customer in identifying the most appropriate combination of products necessary to produce the desired configuration.

Figure 5:
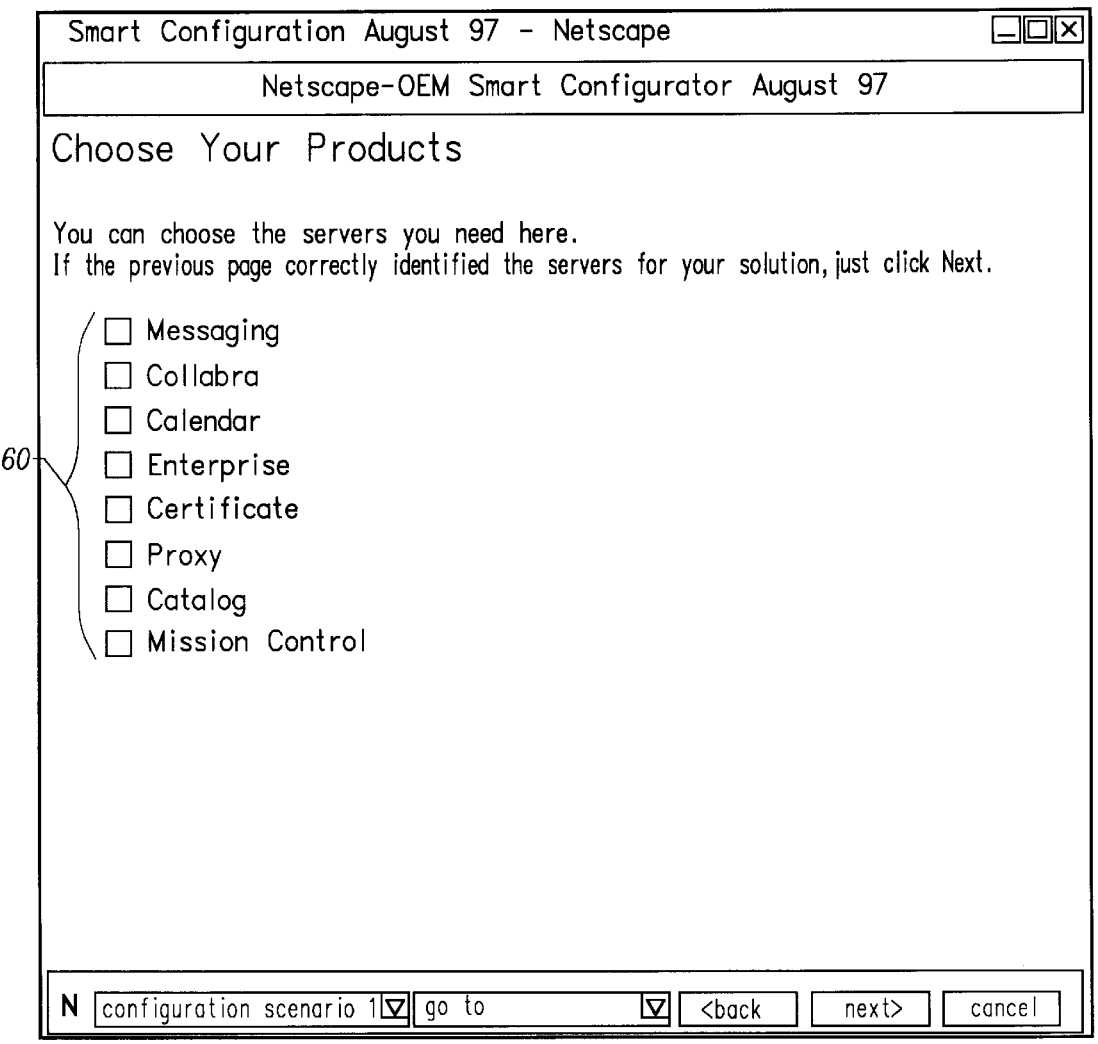
FIG. 5 is an illustration of a product choice page for the smart configurator of FIG. 1 according to the invention.

FIG. 5 is an illustration of a product choice page for the smart configurator of FIG. 1 according to the invention. This page provides a list 60 of company and/or partner products. This page is presented automatically after the customers needs have been assessed and provides a list of products that most nearly fill the customer's needs. The product box may be manually checked, if desired, although the needs identification dialog typically results in an automatic product selection, which is identified by a check that is automatically placed in the box associated with the selected product.

FIG. 6 is an illustration of a pricing information page for the smart configurator of FIG. 1 according to the invention. Once the product has been selected it must be priced. Pricing may include automatic selection of discount pricing levels, the offering of various options, the identification of specific company and/or partner products that may be selected at this time, and various partner discount pricing breaks and other options. For example, in a network where the customer is purchasing a server, the smart configurator allows the customer to specify a client 70, identify the number of user for the server 71, and determine if a pricing discount is available 72. In other embodiments of the invention, additional fields may be provided. Further, actual pricing information may be displayed.

FIG. 7 is an illustration of a product options page for the smart configurator of FIG. 1 according to the invention. As shown in FIG. 7, various packaged options are available for selection and/or individual components may be selected 81, e.g. for a custom installation. The page presents an electronic order form that includes various options, such as whether or not the customer is a subscriber to a software subscription, pricing information, and component requirements. The options page may include by company and partner product information, as well as partner specific options.

FIG. 8 is an illustration of a system needs determination page for the smart configurator of FIG. 1 according to the invention. The actual hardware requirements for a particular software solution are automatically determined by the smart configurator. As shown in FIG. 8, these hardware requirements are identified by a dialog that requests such information as the number of users 90 and various traffic parameters 91, as well as various established hardware configurations 92. As with the other smart configurator pages discussed above, this page may also be customized to include partner information.

FIG. 9 is an illustration of a recommended system configuration page for the smart configurator of FIG. 1 according to the invention. At the end of a needs assessment session, the smart configurator provides a recommended system configuration page that includes the product identification 101, pricing information 105, various options that have been selected 103, and any sales terms and conditions that may be desired 107. This page may also include recommended partner products as appropriate.

Figure 10:
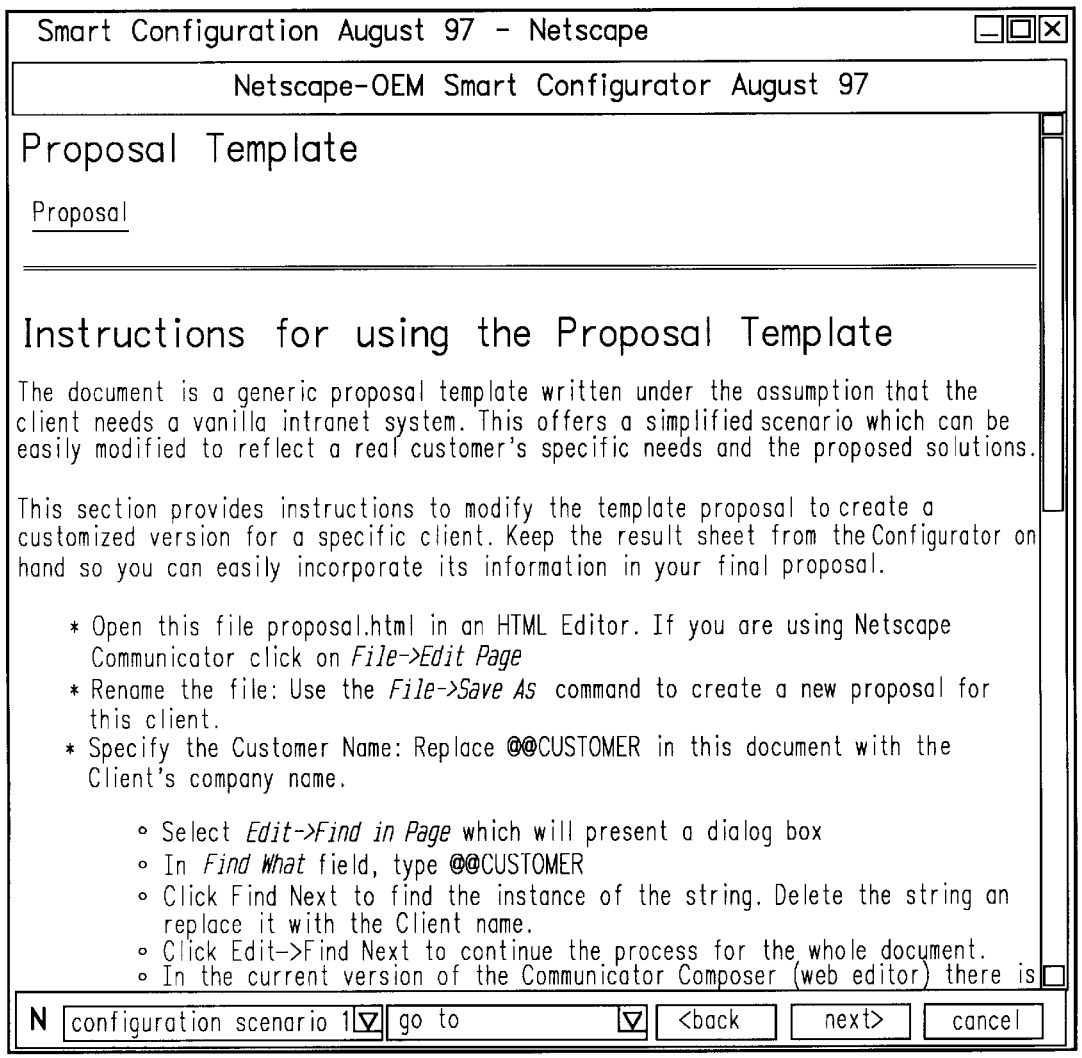
FIG. 10 is an illustration of instructions for a proposal template for the smart configurator of FIG. 1 according to the invention.

FIG. 10 is an illustration of instructions for a proposal template for the smart configurator of FIG. 1 according to the invention. The smart configurator collects all input information obtained during a needs assessment session and stores such information locally. This information is available for various uses, such as for use in generating a customer proposal. The smart configurator provides a proposal template that merges various customer related information into a generic proposal. Editing tools, e.g. Netscape Composer, are provided to allow the proposal to be modified as appropriate. A partner template may be substituted for the company template and/or any number of user selectable templates may be provided.

FIG. 11 is an illustration of a distributor selection page for the smart configurator of FIG. 1 according to the invention. This page allows the selection of a product distributor to be made from a list 111 of available product distributors. The page also shows company SKUs 113 and provides links to partner SKUs 115. The page can also include partner product lists and SKUs, as well a partner distributor information.

Although the invention is described herein with reference to the preferred embodiment, one skilled in the art will readily appreciate that other applications may be substituted for those set forth herein without departing from the spirit and scope of the present invention. For example, the invention provides tool for needs assessment that includes an application in the form of a series of cascading style sheets that assists a user in assessing a solution for the user's needs; a browser for progressing through the style sheets during an interactive, user needs assessment session; means for automatically recommending a solution that most nearly meets the user's needs, based upon the results of the interactive user needs assessment session; and means for maintaining information used by the tool during the needs assessment session current by automatically downloading the information to the tool via a channel on an ongoing basis when the user is on-line; wherein the user may use the tool in both an on-line setting and an off-line setting and have access to current information for effecting the needs assessment. Accordingly, the invention should only be limited by the claims included below.

What is claimed is:

1. A method for needs assessment and product configuration, comprising the steps of:
   providing a configuration tool in the form of a series of cascading style sheets, said configuration tool:
   providing a module that assists a user in determining hardware needs;
   providing a customer needs identification page for assessing a customer's product requirements, in which a customer may select among various statements;
   providing a system needs determination page in which hardware requirements are identified; and providing a recommended system configuration page that provides a recommended system configuration that includes any of product identification, pricing information, various options that have been selected, and sales terms and conditions that may be desired;

progressing through said style sheets during an interactive, off-line customer needs assessment and product configuration session; and automatically recommending a system configuration that most nearly meets a customer's needs, based upon the results of said interactive customer product selection session.

2. The method of claim 1, further comprising the steps of:
providing a proposal template;
collecting customer input; and
merging customer responses during said customer needs assessment and product configuration session into fields within said proposal template.

3. The method of claim 1, wherein said configuration tool is written in client-side JavaScript and dynamic HTML.

4. The method of claim 1, further comprising the step of:
providing updated product information to said configuration tool via an electronic network using push technology.

5. A smart configurator for needs assessment and product configuration, comprising:
a configuration tool in the form of a series of cascading style sheets, said configuration tool comprising:
a module that assists a user in determining hardware needs;
a customer needs identification page for assessing a customer's product requirements, in which a customer may select among various statements;
a system needs determination page in which hardware requirements are identified; and a recommended system configuration page that provides a recommended system configuration that includes any of product identification, pricing information, various options that have been selected, and sales terms and conditions that may be desired;
a browser for progressing through said style sheets during an interactive, off-line customer needs assessment and product configuration session; and
means for automatically recommending a system configuration that most nearly meets a customer's needs, based upon the results of said interactive customer product selection session.

6. The smart configurator of claim 5, wherein said configuration tool operates in connection with either of a workstation and a personal computer.

7. The smart configurator of claim 5, wherein said configuration tool is connected to a network.

8. The smart configurator of claim 7, wherein said network connection allows said configuration tool to access any of a number of remote resources.

9. The smart configurator of claim 8, wherein said remote resources comprise:
any of a pricing and stock keeping unit (SKU) information server; an order entry server; and a technical support server.

10. The smart configurator of claim 5, wherein said customer is guided through a sales process by said configuration tool off-line at a location remote from company facilities.

11. The smart configurator of claim 5, further comprising:
a proposal template including a plurality of fields into which customer input collected during said customer needs assessment and product configuration session is merged.

12. The smart configurator of claim 5, wherein said configuration tool is written in client-side JavaScript and dynamic HTML.

13. The smart configurator of claim 5, further comprising:
means for providing updated product information to said configuration tool via an electronic network using push technology.

14. The smart configurator of claim 5, further comprising:
a product selection module.

15. The smart configurator of claim 5, further comprising:
a pricing calculation module.

16. The smart configurator of claim 5, further comprising:
a module that assists company field personnel in creating a customer proposal.

17. The smart configurator of claim 5, further comprising:
a module that assists company field personnel in locating a part number.

18. The smart configurator of claim 5, further comprising:
a module that provides access to any of company and partner resources.

19. The smart configurator of claim 5, further comprising:
a module that provides pricing and stock keeping unit (SKU) information.

20. The smart configurator of claim 5, further comprising:
a module for capturing any of order entry information and technical support requests, and for communicating with a remote location regarding same.

21. The smart configurator of claim 5, further comprising:
an overview page for providing a navigation tool in which any step in a session may be accessed directly by clicking on that portion of a graphic representation.

22. The smart configurator of claim 5, further comprising:
a product choice page that provides a list of any of company and partner products, said product choice page being presented automatically after a customer's needs have been assessed, said product choice page providing a list of products that most nearly fill said customer's needs.

23. The smart configurator of claim 5, further comprising:
a pricing information page.

24. The smart configurator of claim 5, further comprising:
a product options page for presenting an electronic order form that identifies and allows selection of various product options.

25. The smart configurator of claim 5, further comprising:
a distributor selection page that allows the selection of a product distributor to be made from a list of available product distributors.

26. A tool for needs assessment, comprising:
an application in the form of a series of cascading style sheets that assists a user in assessing a solution for said needs, said application comprising:
a module that assists a user in determining hardware needs;
a customer needs identification page for assessing a customer's product requirements, in which a customer may select among various statements;
a system needs determination page in which hardware requirements are identified; and
a recommended system configuration page that provides a recommended system configuration that includes any of product identification, pricing information, various options that have been selected, and sales terms and conditions that may be desired;
a browser for progressing through said style sheets during an interactive, user needs assessment session;

means for automatically recommending a solution that most nearly meets said user's needs, based upon the results of said interactive user needs assessment session; and means for maintaining information used by said tool during said needs assessment session current by automatically downloading said information to said tool via a channel on an ongoing basis when said user is on-line;

wherein said user may use said tool in both an on-line setting and an off line setting and have access to current information for effecting said needs assessment.

\* \* \* \* \*